(12) United States Patent
Hong (10) Patent No.: US 9,415,473 B2
(45) Date of Patent: Aug. 16, 2016

(54) PART MACHINING APPARATUS FOR VEHICLE

(71) Applicant: Hyundai Motor Company, Seoul (KR)

(72) Inventor: Soonki Hong, Ulsan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 419 days.

(21) Appl. No.: 14/144,311

(22) Filed: Dec. 30, 2013

(65) Prior Publication Data

US 2014/0296048 A1     Oct. 2, 2014

(30) Foreign Application Priority Data

Mar. 28, 2013  (KR) .................. 10-2013-0033493

(51) Int. Cl.
   *B23Q 7/14*     (2006.01)
   *B23Q 3/157*    (2006.01)
   (Continued)

(52) U.S. Cl.
   CPC . *B23P 23/02* (2013.01); *B23Q 1/66* (2013.01); *B23Q 3/15733* (2013.01); *B23Q 11/005* (2013.01); *B23C 1/027* (2013.01); *B23C 3/00* (2013.01); *B23Q 3/061* (2013.01); *B23Q 3/062* (2013.01); *B23Q 7/1426* (2013.01); *B23Q 7/1431* (2013.01); *B23Q 11/0075* (2013.01); *B23Q 11/0891* (2013.01); *Y10S 29/05* (2013.01); *Y10S 29/078* (2013.01); *Y10S 29/094* (2013.01); *Y10T 29/5196* (2015.01); *Y10T 409/30392* (2015.01); *Y10T 409/304088* (2015.01);

(Continued)

(58) Field of Classification Search
   CPC ............ Y10T 409/30532; Y10T 409/305432; Y10T 409/306048; Y10T 409/306104; Y10T 29/5196; Y10T 29/5124; Y10T 483/16; Y10T 483/165; B23Q 1/66
   USPC ........... 409/159, 161, 172, 173; 29/33 P, 563; 198/345.3, 346.1; 483/14–15
   See application file for complete search history.

(56) References Cited

U.S. PATENT DOCUMENTS 4,102,035 A * 7/1978 Voglrieder ............ B23B 31/265
                                                                483/18
4,312,110 A * 1/1982 Averyanov ........... B23Q 7/1431
                                                                198/346.1

(Continued)

FOREIGN PATENT DOCUMENTS

CH           654237 A5 *  2/1986
DE        10119175 A1 * 10/2002
(Continued)

*Primary Examiner* — Erica E Cadugan
(74) *Attorney, Agent, or Firm* — Morgan, Lewis & Bockius LLP (57) ABSTRACT

A part machining apparatus for the vehicle includes a base frame, a machining head that may be mounted on one side on top of the base frame so as to machine automobile parts while rotating with dedicated tools mounted thereon, a tool replacement unit that may be installed over the machining head, may be equipped with a plurality of dedicated tools for different materials of the automobile parts, and supplies a selected dedicated tool to the machining head when machining the automobile parts, a jig unit that may be mounted on the other side on top of the base frame, facing the machining head, and includes two placement pallets corresponding to the automobile parts having different shapes for different vehicle types to fix the automobile parts in position toward the machining head through selective rotation.

11 Claims, 7 Drawing Sheets

(51) Int. Cl.
  B23Q 11/08 (2006.01)
  B23P 23/02 (2006.01)
  B23Q 11/00 (2006.01)
  B23Q 1/66 (2006.01)
  B23Q 3/06 (2006.01)
  B23C 1/027 (2006.01)
  B23C 3/00 (2006.01)

(52) U.S. Cl.
  CPC ............ *Y10T483/115* (2015.01); *Y10T 483/16* (2015.01); *Y10T 483/1733* (2015.01); *Y10T 483/1736* (2015.01); *Y10T 483/1783* (2015.01); *Y10T 483/1891* (2015.01)

(56) References Cited

U.S. PATENT DOCUMENTS

| | | | | |
|---|---|---|---|---|
| 4,673,076 | A * | 6/1987 | Mattson | B23Q 7/1431 198/346.1 |
| 5,018,617 | A * | 5/1991 | Miyata | B23Q 7/1431 198/346.1 |
| 5,044,486 | A * | 9/1991 | Kitamura | B23Q 7/10 198/346.1 |
| 5,205,806 | A * | 4/1993 | Ishida | B23F 23/006 29/33 P |
| 5,265,497 | A * | 11/1993 | Curless | F16P 3/08 198/346.1 |
| 5,803,229 | A * | 9/1998 | Hosokawa | B23B 31/113 198/345.3 |
| 6,210,086 | B1 * | 4/2001 | Lecornet | B23Q 11/0042 408/67 |
| 6,338,705 | B1 * | 1/2002 | Cavallo | B23P 23/02 29/26 A |
| 6,884,009 | B2 * | 4/2005 | Maeda | B23Q 11/0891 409/134 |
| 7,147,595 | B1 * | 12/2006 | Chen | B23C 1/06 29/33 P |
| 7,694,799 | B2 * | 4/2010 | Bae | B23Q 7/1431 198/345.1 |
| 2001/0029970 | A1 * | 10/2001 | Kantola | B08B 3/02 134/32 |
| 2003/0115736 | A1 * | 6/2003 | Kurz | B23Q 3/15533 29/558 |
| 2006/0189464 | A1 * | 8/2006 | Corbean | B23Q 3/15533 483/63 |
| 2010/0145498 | A1 * | 6/2010 | Uchikawa | B23Q 17/22 700/179 |

FOREIGN PATENT DOCUMENTS

| | | | |
|---|---|---|---|
| JP | 61-071933 A | * | 4/1986 |
| JP | 02-185341 A | * | 7/1990 |
| JP | 02-224943 A | * | 9/1990 |
| JP | 07-060589 A | * | 3/1995 |
| JP | 2005-297160 A | * | 10/2005 |
| JP | 2007-190623 A | * | 8/2007 |

* cited by examiner

PART MACHINING APPARATUS FOR VEHICLE

CROSS-REFERENCE TO RELATED APPLICATION

The present application claims priority to Korean Patent Application No. 10-2013-0033493 filed on Mar. 28, 2013, the entire contents of which is incorporated herein for all purposes by this reference.

BACKGROUND OF THE INVENTION

1. Field of the Invention

The present invention relates to a part machining apparatus for a vehicle which is commonly applicable to automobile parts of different materials and shapes for many types of vehicles by automatically selecting tools suitable for parts of different materials.

2. Description of Related Art

In general, engine parts such as a cylinder head or cylinder block and many automobile parts such as an automatic transmission are mounted on a vehicle. These parts have different shapes and sizes according to vehicle types, and especially, they are made of materials such as cast iron (Fc) or aluminum (Al) according to vehicle types.

These automotive parts are machined by a part machining apparatus on which a variety of tools are mounted, according to their materials. After the machining is complete, they are transferred to a vehicle body assembly process.

However, the above-mentioned conventional part machining apparatus for a vehicle have the problems of narrow space due to increased installation area, complex equipment layout, and increased installation costs, if individual parts machining apparatuses are installed in the assembly line so as to make automobile parts requiring machining suitable for different materials, sizes, and shapes according to vehicle types.

Moreover, the use of a single part machining apparatus requires replacing a pallet, on which automobile parts of different shapes and materials are placed, and dedicated tools for different materials, in order to machine the automobile parts, and as a result it takes excessive time to replace the dedicated tools and the pallet. This poses a problem of declining productivity because of the increased overall cycle time for this process.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a part machining apparatus for a vehicle, which makes it possible to machine automobile parts of different materials with a single piece of equipment, and therefore improves productivity through a reduction in overall cycle time resulting from reduced time for tool replacement, reduces the installation area within the process line, and cuts down on installation costs, because the part machining apparatus is commonly applicable to automobile parts of different materials and shapes for many types of vehicles by automatically selecting tools suitable for automobile parts of different materials.

In an aspect of the present invention, a part machining apparatus for a vehicle, the apparatus may include a base frame, a machining head that is mounted on one side on top of the base frame so as to machine automobile parts while rotating with dedicated tools mounted thereon, a tool replacement unit that is installed over the machining head, is equipped with a plurality of the dedicated tools for different materials of the automobile parts, and supplies a selected dedicated tool to the machining head in machining the automobile parts, a jig unit that is mounted on the other side on top of the base frame, facing the machining head, and may include two placement pallets corresponding to the automobile parts having different shapes for different vehicle types to fix the automobile parts in position toward the machining head through selective rotation.

A cover frame for covering the machining head, the tool placement unit, and the jig unit mounted on the top of the base frame is mounted around the outside of the base frame.

An air nozzle is mounted to an inner upper portion of the cover frame, corresponding to the machining head, in order to remove chips produced during machining of the automobile parts.

The jig unit may include a rotary motor that is mounted on the other side on top of the base frame, a rotating plate that is mounted on the top of a rotating shaft of the rotary motor, may include the two placement pallets, on which the automobile parts are placed and clamped, mounted on either side of an upper surface of the rotating plate, and is selectively rotated depending on whether the rotary motor is activated or not, and an air supply device that is provided under the rotating plate, on the side of the machining head with respect to the rotary motor, and configured to spray high-pressure air to the automobile parts so as to remove chips produced during processing of the automobile parts.

The air supply device may include a spray nozzle that sprays the high-pressure air to the automobile parts placed and clamped to the top of the rotating plate through the two placement pallets, at least one coupling that is provided along a circumferential direction around the spray nozzle and fixes the rotating plate positioned on top of the spray nozzle, a blow cap that is mounted on top of the spray nozzle between the spray nozzle and each coupling so as to prevent the chips from going into each coupling by distributing a part of the air sprayed from the spray nozzle to each coupling.

The blow cap may have a cone shape that slopes downward toward the outside from the spray nozzle.

An outer side of the air supply device is enclosed with a cylindrical cover housing.

The tool replacement unit may include a mounting frame that is mounted over the machining head, a rotating conveyor that is selectively rotated along the longitudinal direction in the center of the mounting frame, by actuating a drive motor, tool mounting heads that are provided at regular intervals along an outer circumferential surface of the rotating conveyor, and to which the dedicated tools supplied to the machining head are mounted, and a tool supply device that is mounted at a position corresponding to the machining head, spaced apart from the drive motor, and supplies a dedicated tool requiring machining, among the dedicated tools mounted through the tool mounting heads provided on the rotating conveyor, to the machining head.

The dedicated tools for the different materials of the automobile parts are respectively mounted to the tool mounting heads, on either side of the length direction of rotating conveyor.

The dedicated tools are prepared for use in machining cast steel (Fc) and aluminum (Al) materials.

The tool supply device may include a mounting bracket that is mounted on one side of the mounting plate corresponding to the machining head, on one side of the drive motor mounted through the mounting plate, and an actuating cylinder that may include an actuating rod and is mounted on the mounting bracket to move a selected dedicated tool downward toward the machining head.

As described above, the part machining apparatus according to the exemplary embodiment of the present invention makes it possible to machine automobile parts of different materials with a single piece of equipment, and therefore improves productivity through a reduction in overall cycle time resulting from reduced time for tool replacement, reduces the installation area within the process line, and cuts down on installation costs, because the part machining apparatus is commonly applicable to automobile parts of different materials and shapes for many types of vehicles by automatically selecting tools suitable for automobile parts of different materials. As a result, the part machining apparatus can be commonly used for the automobile parts of different materials for many vehicle types.

In addition, productivity improvement can be achieved through a reduction in overall cycle time resulting from reduced time for the replacement of the placement pallets and the dedicated tools depending on the materials and shapes of the automobile parts.

Moreover, because only a single piece of equipment is installed in the process line, this can decrease the installation area in the process line, simplify the layout of equipment, and cut down on installation costs.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Accordingly, since the exemplary embodiments disclosed herein and configurations illustrated in the drawings are only the most preferable embodiment and are not intended to represent all technical items of the invention, it should be appreciated that other various equivalents and modifications capable of substituting for the disclosed embodiments exist at the filing time point of the invention.

Figure 1:
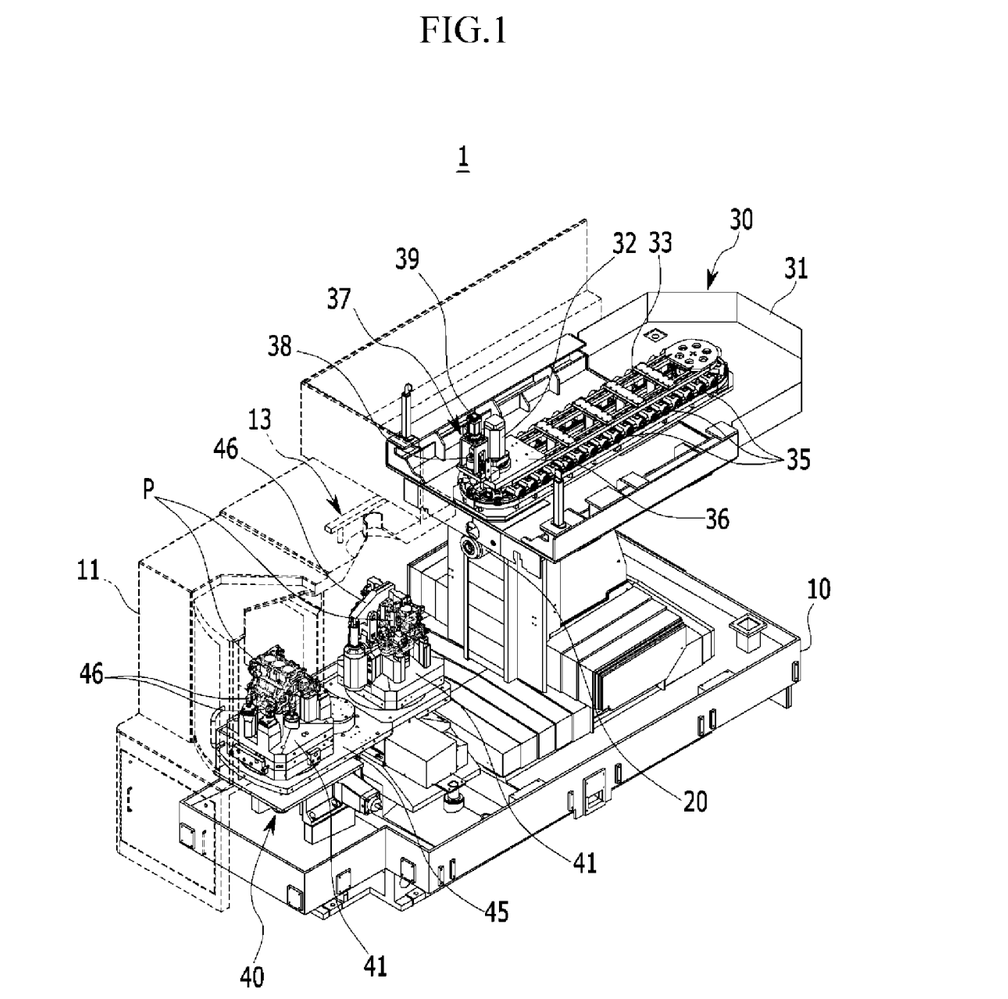
FIG. 1 is a perspective view of a part machining apparatus for a vehicle according to an exemplary embodiment of the present invention.
Figure 2:
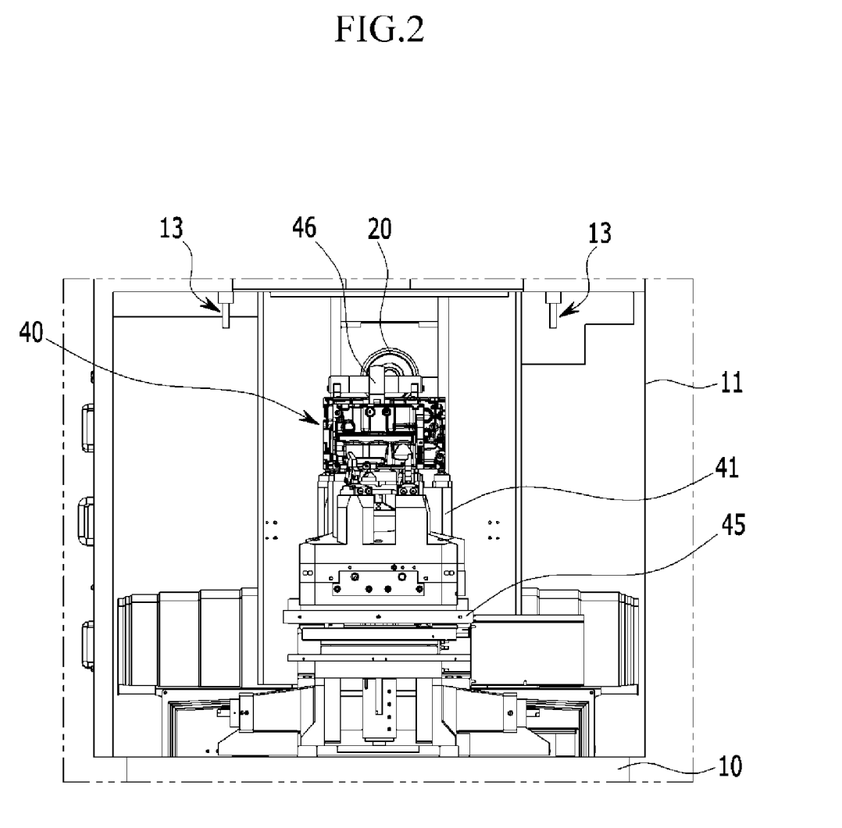
FIG. 2 is a side view of the part machining apparatus for the vehicle according to the exemplary embodiment of the present invention.
Figure 3:
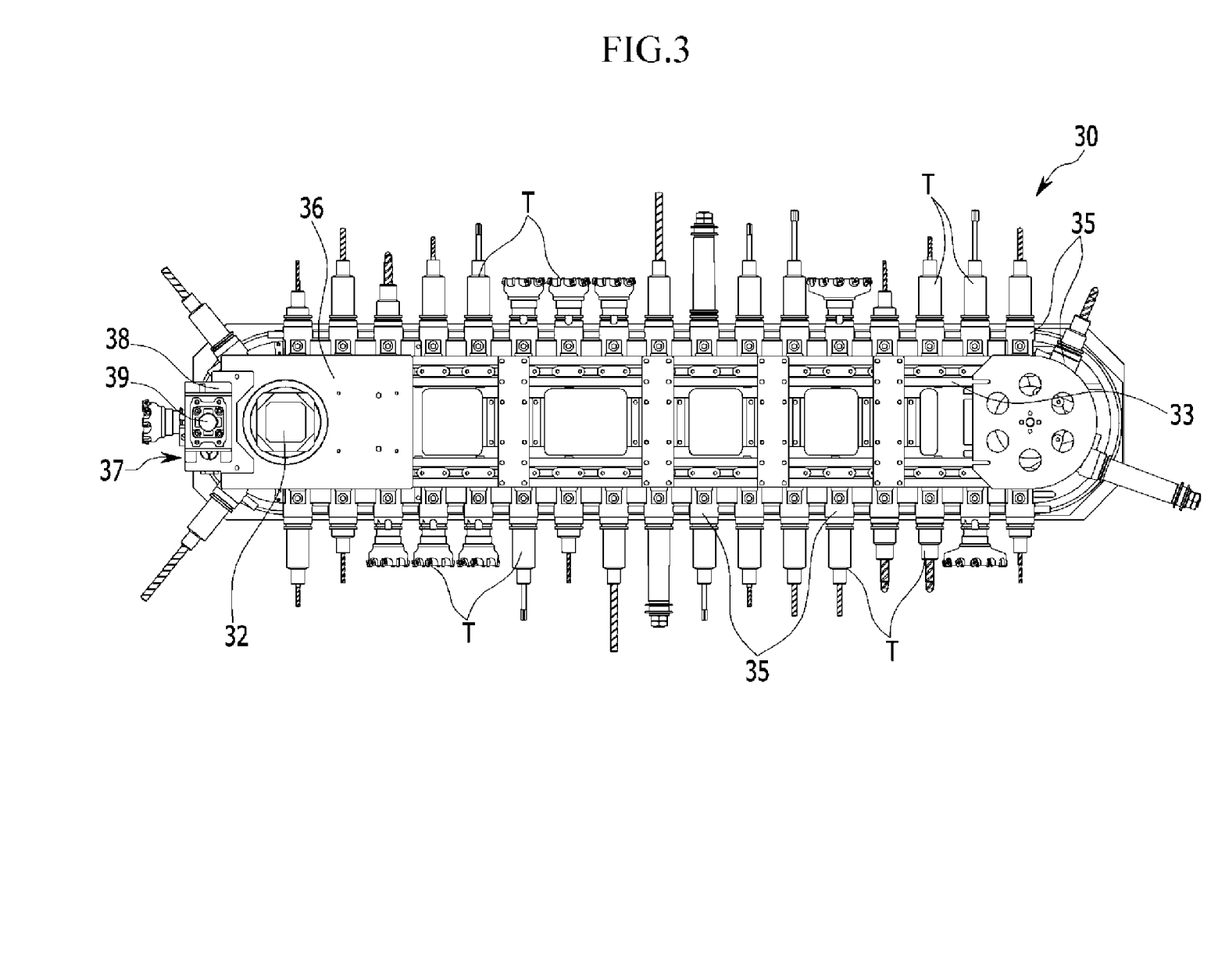
FIG. 3 is a top plan view of a tool replacement unit which is applied to the part machining apparatus for the vehicle according to the exemplary embodiment of the present invention.
Figure 4:
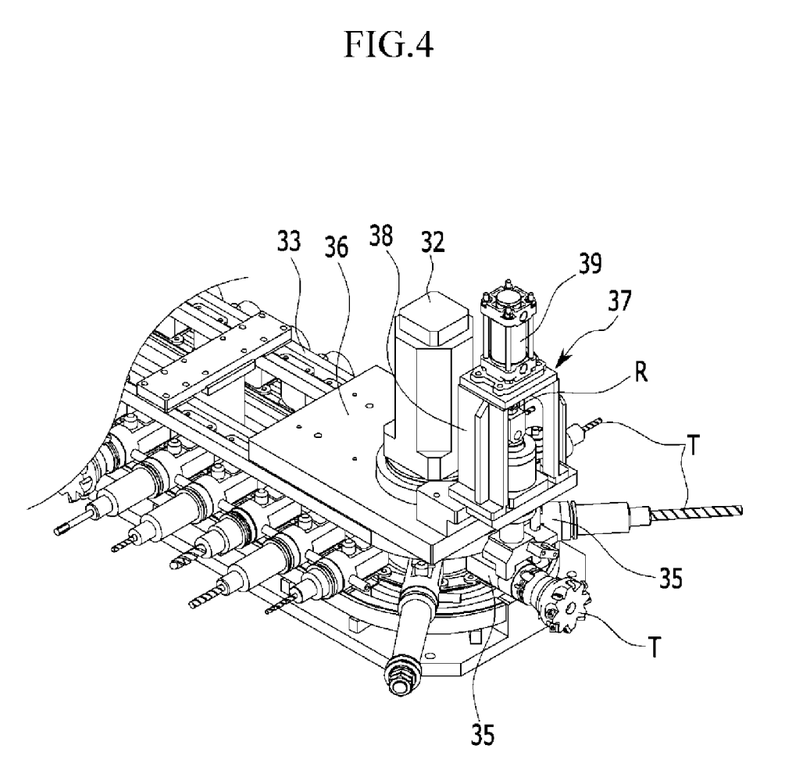
FIG. 4 is a partial perspective view of the tool replacement unit according to the exemplary embodiment of the present invention.
Figure 5:
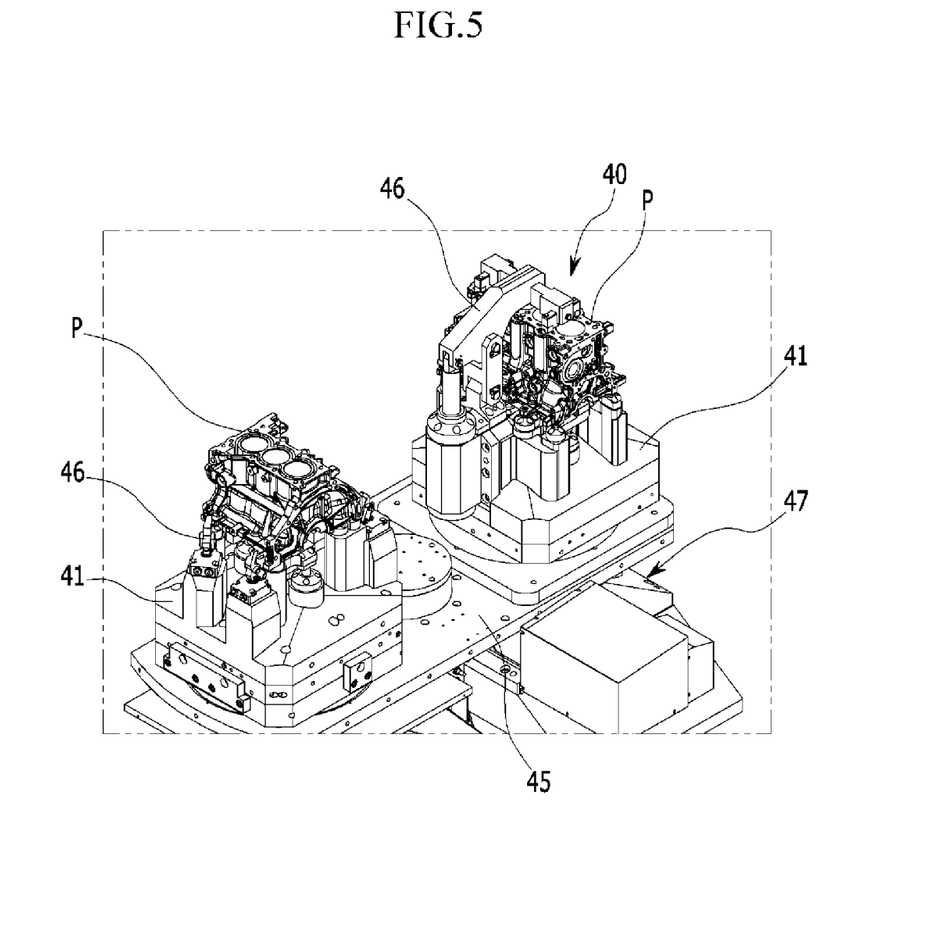
FIG. 5 is a perspective view of a jig unit which is applied to the part machining apparatus for the vehicle according to the exemplary embodiment of the present invention.
Figure 6:
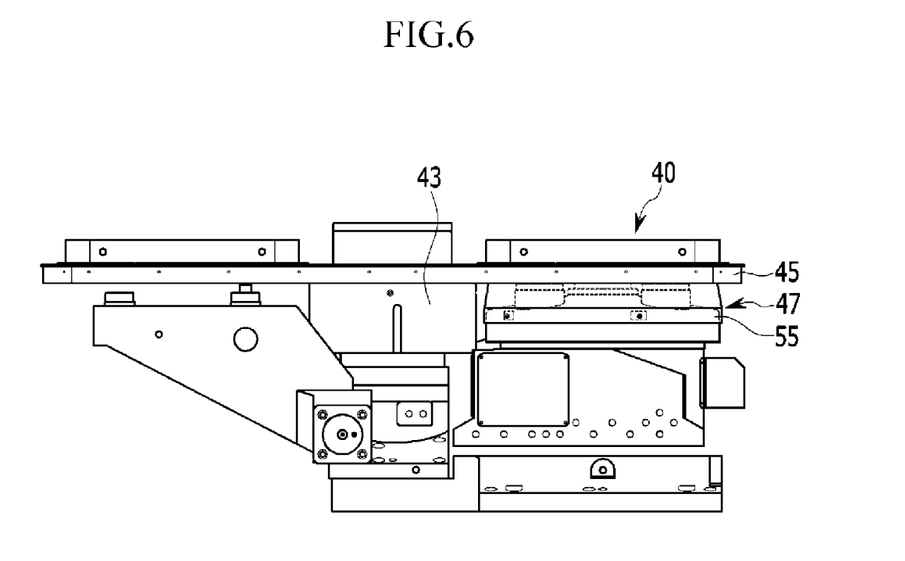
FIG. 6 is a side view of the jig unit according to the exemplary embodiment of the present invention.
Figure 7:
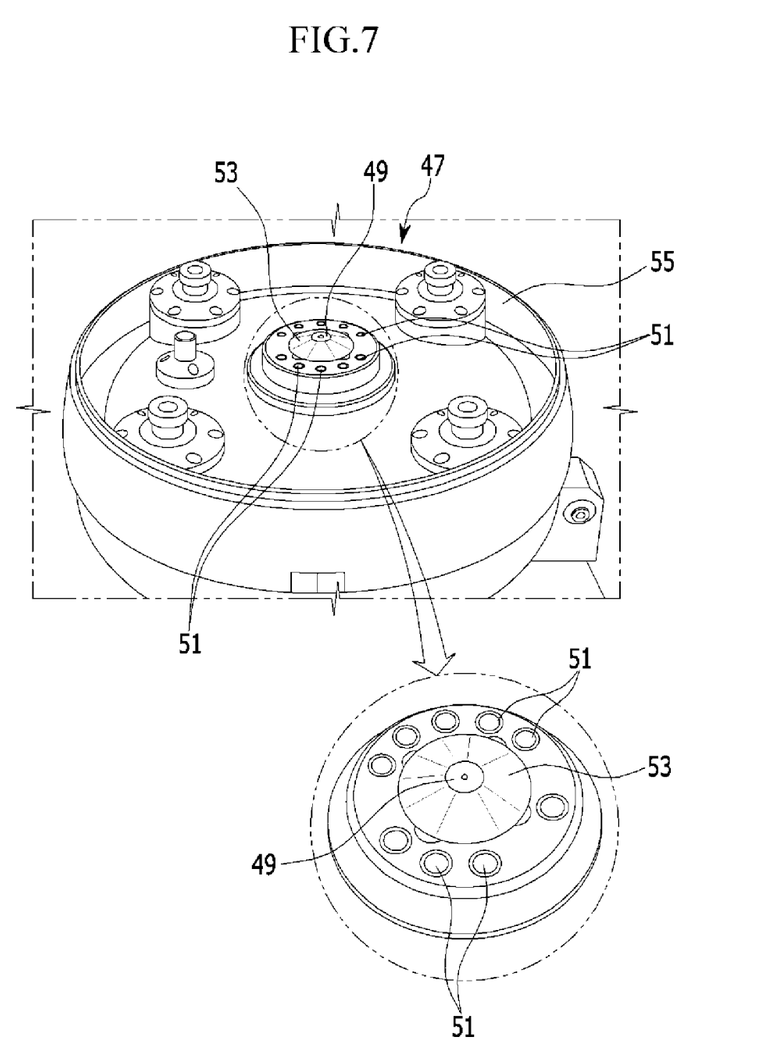
FIG. 7 is a perspective view of air supply device which is applied to the jig unit in the part machining apparatus for the vehicle according to the exemplary embodiment of the present invention.

FIG. 1 and FIG. 2 are perspective and side views of a part machining apparatus for a vehicle according to an exemplary embodiment of the present invention. FIG. 3 is a top plan view of a tool replacement unit which is applied to the part machining apparatus for the vehicle according to the exemplary embodiment of the present invention. FIG. 4 is a partial perspective view of the tool replacement unit according to the exemplary embodiment of the present invention. FIG. 5 is a perspective view of a jig unit which is applied to the part machining apparatus for the vehicle according to the exemplary embodiment of the present invention. FIG. 6 is a side view of the jig unit according to the exemplary embodiment of the present invention. FIG. 7 is a perspective view of air supply device which is applied to the jig unit in the part machining apparatus for the vehicle according to the exemplary embodiment of the present invention.

Referring to the drawings, the part machining apparatus 1 according to the exemplary embodiment of the present invention has such a structure that it makes it possible to machine automobile parts P of different materials with a single piece of equipment, and therefore improves productivity through a reduction in overall cycle time resulting from reduced time for tool replacement, reduces the installation area within the process line, and cuts down on installation costs, because the part machining apparatus 1 is commonly applicable to automobile parts P of different materials and shapes for many types of vehicles by automatically selecting tools suitable for automobile parts of different materials.

To this end, as shown in FIG. 1 and FIG. 2, the part machining apparatus 1 for the vehicle according to the exemplary embodiment of the present invention includes a base frame 10, a machining head 20, a tool replacement unit 30, and a jig unit 40.

Firstly, the base frame 10 is installed on the floor of the workplace for this line.

A cover frame 11 for covering the machining head 20, tool placement unit 30, and jig unit 40 mounted on the top of the base frame 10 is mounted around the outside of the base frame 10, and prevents chips produced from the automobile parts P from being scattered to the outside during machining.

An air nozzle 13 may be mounted to an inner upper portion of the cover frame 11, corresponding to the machining head 20, in order to prevent chips produced during machining of the automobile parts P from going into the automobile parts P or the jig unit 40.

The air nozzle 13 functions to cause chips, produced upon spraying high-pressure air during machining of the automobile parts P using dedicated tools T mounted on the machining head 20, to fall on the floor of the workplace from the inside of the cover frame 11, and prevent the chips from going into the automobile parts P, machining head 20, and jig unit 40.

In the present exemplary embodiment, the machining head 20 is mounted on one side on top of the base frame 10 so as to machine the automobile parts while rotating with the dedicated tools T mounted thereon.

The machining head 20 performs machining operations, such as drilling, milling, boring, tapping, spot facing, and end milling, on the automobile parts P requiring machining.

In the present exemplary embodiment, the tool replacement unit 30 is installed over the machining head 20, is equipped with a plurality of dedicated tools T for different materials of the automobile parts P, and supplies a selected dedicated tool T to the machining head 20 when machining the automobile parts P, as shown in FIGS. 3 and 4.

The tool replacement unit 30 includes a mounting frame 31, a rotating conveyor 33, tool mounting heads 35, and tool supply device 37.

First of all, the mounting frame 31 is mounted over the machining head 20.

In the present exemplary embodiment, the rotating conveyor 33 is selectively and rotatably mounted along the longitudinal direction in the center of the mounting frame 31, by actuating a drive motor 32.

The tool mounting heads 35 are provided at equal intervals along the outer circumferential surface of the rotating conveyor 33, and the dedicated tools T supplied to the machining head 20 are respectively mounted to the tool mounting heads 35.

The dedicated tools T for different materials of the automobile parts P may be respectively mounted to the tool mounting heads 35, on either side of the length of rotating conveyor 33.

Meanwhile, in the present exemplary embodiment, the dedicated tools T may be prepared for use in machining cast steel (Fc) and aluminum (Al) materials, to correspond to the automobile parts, such as a cylinder block, formed of cast steel (Fc) and aluminum (Al) materials.

The tool supply device 37 is mounted at a position corresponding to the machining head 20, spaced apart from the drive motor 32, and supplies a dedicated tool T requiring machining, among the dedicated tools T mounted through the tool mounting heads 35 provided on the rotating conveyor 33, to the machining head 20.

The tool supply device 37 includes a mounting bracket 38 that is mounted on one side of the mounting plate 36 corresponding to the machining head 20, on one side of the drive motor 32 mounted through the mounting plate 36, and an actuating cylinder 39 that includes an actuating rod R and is mounted on the mounting bracket 38 to move a selected dedicated tool T downward toward the machining head 20.

That is, the tool replacement unit 30 with the above configuration rotates the rotating conveyor 33 by actuating the drive motor 32 so that one T, selected among the dedicated tools T mounted on the tool mounting heads 35 according to the material of a vehicle part P to be machined and according to machining methods such as drilling, milling, boring, tapping, spot facing, and end milling, is fixed in position at the tool supply device 37.

Afterwards, once the selected dedicated tool T is fixed in position at the tool supply device 37, the actuating rod R of the actuating cylinder 39 descends and moves the dedicated tool T mounted on the tool mounting head 35 to the machining head, and the moved dedicated tool T is mounted on the machining head 20.

As shown in FIG. 5 and FIG. 6, the jig unit 40 is mounted on the other side on top of the base frame 10, facing the machining head 20, and includes two placement pallets 41 corresponding to the automobile parts P having different shapes for different vehicle types to fix the automobile parts P in position toward the machining head 20 through selective rotation.

The jig unit 40 includes a rotary motor 43, a rotating plate 45, and air supply device 47.

Firstly, the rotary motor 43 is mounted on the other side on top of the base frame 10.

In the present exemplary embodiment, the center of the rotating plate 45 is mounted on the top of the rotating shaft of the rotary motor 43, the placement pallets 41, on which the automobile parts P are placed and clamped, are mounted on either side of the upper surface of the rotating plate 45, and the rotating plate 45 is selectively rotated depending on whether the rotary motor 43 is activated or not.

That is, the rotary motor 43 selectively rotates the rotating plate 45 so that the vehicle part P to be machined, among the automobile parts P placed on the placement pallets 41, is positioned on the machining head 20.

Meanwhile, the automobile parts P placed on the placement pallets 41 are fixed by a clamping unit 46 installed on the placement pallets 41, taking on different forms depending on what the automobile parts P look like.

As shown in FIG. 6 and FIG. 7, the air supply device 47 is provided under the rotating plate 45, on the side of the machining head 20 with respect to the rotary motor 43, and sprays high-pressure air to the automobile parts P so as to remove chips produced during processing of the automobile parts P.

As shown in FIG. 7, the air supply device 47 includes a spray nozzle 49, a coupling 51, and a blow cap 53.

Firstly, the spray nozzle 49 sprays high-pressure air to the automobile parts P placed and clamped to the top of the rotating plate 45 through the placement pallets 41.

The coupling 51 is provided in plural number along the circumferential direction around the spray nozzle 49, and moves forward or backward depending on whether an operating pressure is supplied or not, to fix the rotating plate 45 positioned on top of the spray nozzle 49.

The blow cap 53 is mounted on top of the spray nozzle between the spray nozzle 49 and each coupling 51 so as to prevent chips or impurities produced during processing of the automobile parts P from going into each coupling 51 by distributing part of the air sprayed from the spray nozzle 49 to each coupling 51.

The blow cap 53 may have a cone shape that slopes downward toward the outside from the spray nozzle 49.

Accordingly, chips that fall on top of the blow cap 53 are moved toward the outside of the blow cap 53.

In this case, the blow cap 53 prevents wrong operations of the couplings 51 by preventing chips, produced by spraying part of the air sprayed from the spray nozzle 49 to the couplings 51, from going into the couplings 51 moved forward to fix the rotating plate 45.

The outer side of the thus-configured air supply device 47 can be enclosed with a cylindrical cover housing 55.

Accordingly, the thus-configured part machining apparatus 1 according to the exemplary embodiment of the present invention makes it possible to machine automobile parts P of different materials with a single piece of equipment, and therefore improves productivity through a reduction in overall cycle time resulting from reduced time for tool replacement, reduces the installation area within the process line, and cuts down on installation costs, because the part machining apparatus 1 is commonly applicable to automobile parts P of different materials and shapes for many types of vehicles by automatically selecting tools T suitable for automobile parts P of different materials. As a result, the part machining apparatus 1 can be commonly used for the automobile parts P of different materials for many vehicle types.

In addition, productivity improvement can be achieved through a reduction in overall cycle time resulting from reduced time for the replacement of the placement pallets 41 and the dedicated tools T depending on the materials and shapes of the automobile parts P.

Moreover, because only a single piece of equipment is installed in the process line, this can decrease the installation area in the process line, simplify the layout of equipment, and cut down on installation costs.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A part machining apparatus for machining parts for a vehicle, the apparatus comprising:
    a base frame;
    a machining head that is mounted on one side of the base frame and on top of the base frame so as to machine the vehicle parts while the machining head is rotating with a tool mounted thereon;
    a tool replacement unit that is installed over the machining head, that is equipped with a plurality of tools for machining different materials of the vehicle parts, and that supplies a selected one of the tools to the machining head for machining the vehicle parts; and
    a jig unit that is mounted on an opposite side of the base frame with respect to the machining head and on top of the base frame, and that includes a rotating plate for supporting two placement pallets for receiving the vehicle parts, the rotating plate configured to selectively rotate so as to place one of the placement pallets in a position for enabling the vehicle parts received thereby to be machined by the machining head, while also placing the other of the placement pallets in a position out of a machining range of the machining head,
    wherein an air supply device is provided under the rotating plate and is configured to spray air to the vehicle parts mounted on one of the placement pallets while the one placement pallet and the vehicle parts received thereby are located on top of the rotating plate, so as to remove chips produced during the machining.

2. The part machining apparatus of claim 1, wherein a cover frame, for covering the machining head, the tool replacement unit, and the jig unit mounted on the top of the base frame, is mounted around the outside of the base frame.

3. The part machining apparatus of claim 2, wherein an air nozzle is mounted to an inner upper portion of the cover frame, corresponding to the machining head, in order to remove chips produced during the machining of the vehicle parts.

4. The part machining apparatus of claim 1, wherein the jig unit further comprises:
    a rotary motor that is mounted on said opposite side of the base frame and on top of the base frame;
    wherein the rotating plate is mounted on the top of a rotating shaft of the rotary motor, and supports the two placement pallets, on which the vehicle parts are placed and clamped, wherein the two placement pallets are mounted one on each of two opposite sides of an upper surface of the rotating plate, and wherein the rotating plate is selectively rotated depending on whether the rotary motor is activated or not; and
    wherein the air supply device is provided between the machining head and the rotary motor.

5. The part machining apparatus of claim 1, wherein the air supply device comprises:
    a spray nozzle that sprays the air to the vehicle parts mounted to the one placement pallet while the one pallet is in the position for enabling the vehicle parts received thereby to be machined by the machining head;
    at least one coupling that is provided along a circumferential direction around the spray nozzle and that fixes the rotating plate, which rotating plate is positioned on top of the spray nozzle;
    a blow cap that is mounted on top of the spray nozzle between the spray nozzle and each coupling of the at least one coupling so as to prevent the chips from going into each coupling of the at least one coupling by distributing a part of the air sprayed from the spray nozzle to each coupling of the at least one coupling.

6. The part machining apparatus of claim 5, wherein the blow cap has a cone shape that slopes downward and toward an outside of the blow cap from the spray nozzle.

7. The part machining apparatus of claim 1, wherein an outer side of the air supply device is enclosed with a cylindrical cover housing.

8. The part machining apparatus of claim 1, wherein the tool replacement unit comprises:
    a mounting frame that is mounted over the machining head;
    a rotating conveyor that is selectively rotated by actuating a drive motor;
    tool mounting heads that are provided at regular intervals along an outer circumferential surface of the rotating conveyor, and to which tools to be supplied to the machining head are mounted; and
    a tool supply device that is mounted at a position corresponding to the machining head, spaced apart from the drive motor, and that supplies a tool required for performing machining, among the tools mounted via the tool mounting heads provided on the rotating conveyor, to the machining head.

9. The part machining apparatus of claim 8, wherein the tools for machining the different materials of the vehicle parts are each mounted to a respective one of the tool mounting heads, and wherein the tool mounting heads are located on two opposite sides of a length direction of the rotating conveyor.

10. The part machining apparatus of claim 8, wherein the tools include tools that are for use in machining cast steel (Fc) and aluminum (Al) materials.

11. The part machining apparatus of claim 8, wherein the tool supply device comprises:
- a mounting plate, wherein the drive motor is mounted to the mounting plate;
- a mounting bracket that is mounted on one side of the mounting plate, which one side of the mounting plate corresponds to the machining head, on one side of the drive motor; and
- an actuating cylinder that includes an actuating rod and that is mounted on the mounting bracket to move a selected dedicated tool downward toward the machining head.

* * * * *